United States Patent [19]

Hartsell, Jr. et al.

[11] Patent Number: 5,782,275
[45] Date of Patent: Jul. 21, 1998

US005782275A

[54] ONBOARD VAPOR RECOVERY DETECTION

[75] Inventors: Hal C. Hartsell, Jr., Kernersville; Edward A. Payne, Greensboro; Paul D. Miller, Winston-Salem; Mark B. Tucker, Colfax, all of N.C.

[73] Assignee: Gilbarco Inc., Greensboro, N.C.

[21] Appl. No.: 649,455

[22] Filed: May 17, 1996

[51] Int. Cl.$^6$ .................................................. B65B 1/30
[52] U.S. Cl. ............................. 141/94; 141/59; 141/392
[58] Field of Search ........................... 141/59, 94, 290, 141/392, 83; 73/23.2; 340/632

[56] References Cited

U.S. PATENT DOCUMENTS

| | | | |
|---|---|---|---|
| 4,469,149 | 9/1984 | Walkey et al. | 141/94 |
| 4,838,323 | 6/1989 | Watts | 141/1 |
| 4,887,578 | 12/1989 | Woodcock et al. | 123/519 |
| 5,053,774 | 10/1991 | Schuermann et al. | 342/44 |
| 5,134,875 | 8/1992 | Jensen et al. | 73/1 |
| 5,165,379 | 11/1992 | Thompson | 123/520 |
| 5,209,275 | 5/1993 | Akiba et al. | 141/83 |
| 5,249,612 | 10/1993 | Parks et al. | 141/219 |
| 5,273,087 | 12/1993 | Koch et al. | 141/94 |
| 5,316,057 | 5/1994 | Hasselmann | 141/94 |
| 5,319,199 | 6/1994 | Stedman et al. | 250/338.5 |
| 5,450,883 | 9/1995 | Payne et al. | 141/59 |
| 5,476,125 | 12/1995 | Mitchell | 141/59 |
| 5,507,325 | 4/1996 | Finlayson | 141/83 |
| 5,562,133 | 10/1996 | Mitchell | 141/206 |
| 5,605,182 | 2/1997 | Oberrecht et al. | 141/94 |

FOREIGN PATENT DOCUMENTS

| | | |
|---|---|---|
| 0 653 376 A | 5/1995 | European Pat. Off. . |
| 2 206 561 | 1/1989 | United Kingdom . |

OTHER PUBLICATIONS

Workshop–Vapor Recovery Procedures; California Enivronmental Protection Agency, Oct. 6, 1997.
California Environmental Protection Agency Air Resources Board; Vapor Recovery Test Procedure Oct. 6, 1997.
OPW Fueling Components Brochure entitled "ORVR/Stage II Compatibility: Keeping Onboard and Vac–Assist Systems From Pulling in Opposite Directions" Undated, but date believed to be Jul., 1997.

Gilbarco Inc. literature: "VaporVac Vacuum Assist Vapor Recovery" Undated.

Chrysler Corporation literature: "Integrated Refueling/Evaporative Emissions Control System with Liquid Seal Refueling Vapor Control" Undated.

CARB Workshop Notice, Feb. 9, 1994, Mailout #94–08.

CARB Staff Proposed Recommendation For The Adoption Of The United States Environmental Protection Agency's Vehicle Refueling Standard and Test Procedures, May 27, 1994, Mailout #94–23.

*Primary Examiner*—David J. Walczak
*Assistant Examiner*—Timothy L. Maust
*Attorney, Agent, or Firm*—Rhodes Coats & Bennett, L.L.P.

[57] ABSTRACT

An apparatus for detecting a vehicle having a vapor recovery system having a fuel dispenser configured to deliver fuel to a fuel tank of a vehicle, a vapor recovery system operatively associated with the fuel dispenser having a vapor path for removing fuel vapor expelled from the fuel tank of the vehicle during a fueling operation, and a hydrocarbon vapor sensor associated with the vapor path for sensing the fuel vapors in the vapor path, wherein when the vapor sensor does not sense fuel vapor during the fueling operation, the fuel dispenser determines the vehicle contains an onboard vapor recovery system. Once a vehicle having an onboard vapor recovery system is detected, the vapor recovery system is either shut off or adjusted during the fueling operation to minimize fugitive emissions.

23 Claims, 8 Drawing Sheets

ONBOARD VAPOR RECOVERY DETECTION

BACKGROUND OF THE INVENTION

The present invention relates generally to vapor recovery systems associated with both automobiles and fuel dispensers and, more particularly, to a fuel dispenser vapor recovery system capable of detecting the presence of an onboard vapor recovery system in an automobile. For the past several years, the Environmental Protection Agency has been proposing various regulations to limit the amount of fuel vapor released into the atmosphere during the refueling of a motor vehicle. During a conventional or standard fueling operation, incoming fuel displaces fuel vapor from the head space of a fuel tank and out through the filler pipe into the atmosphere if not contained and recovered. The air pollution resulting from this situation is undesirable. Currently, many fuel dispensing pumps at service stations are equipped with vapor recovery systems that collect fuel vapor vented from the fuel tank filler pipe during the fueling operation and transfer the vapor to a fuel storage tank.

Recently, onboard, or vehicle carried, fuel vapor recovery and storage systems (commonly referred to as onboard recovery vapor recovery or ORVR) have been developed in which the head space in the vehicle fuel tank is vented through a charcoal-filled canister so that the vapor is absorbed by the charcoal. Subsequently, the fuel vapor is withdrawn from the canister into the engine intake manifold for mixture and combustion with the normal fuel and air mixture. Because the fuel tank head space must be vented to enable fuel to be withdrawn from the tank during vehicle operation, this invention addresses a problem of the discharge of fuel vapor through the atmospheric vent of the tank when ambient pressure and temperature conditions are such that vapor pressure within the fuel tank exceeds atmospheric pressure.

In typical ORVR systems, a canister outlet is connected to the intake manifold of the vehicle engine through a normally closed purge valve. The canister is intermittently subjected to the intake manifold vacuum with the opening and closing of the purge valve between the canister and intake manifold. A computer which monitors various vehicle operating conditions controls the opening and closing of the purge valve to assure that the fuel mixture established by the fuel injection system is not overly enriched by the addition of fuel vapor from the canister to the mixture.

Fuel dispensing systems having vacuum assisted vapor recovery capability which are unable to detect ORVR systems will waste energy, increase wear and tear, ingest excessive air into the underground storage tank and cause excessive pressure buildup in the underground storage tank due to the expanded volume of hydrocarbon saturated air. Recognizing an ORVR system and adjusting the fuel dispenser's vapor recovery system accordingly eliminates the redundancy associated with operating two vapor recovery systems for one fueling operation. The problem of incompatibility of assisted vapor recovery and ORVR was discussed in "Estimated Hydrocarbon Emissions of Phase II and Onboard Vapor Recovery Systems" dated Apr. 12, 1994, amended May 24, 1994, by the California Air Resources Board. That paper suggests the use of a "smart" interface on a nozzle to detect an ORVR vehicle and close one vapor intake valve on the nozzle when an ORVR vehicle is being filled.

Adjusting the fuel dispenser's vapor recovery system will mitigate fugitive emissions by reducing underground tank pressure. Reducing underground tank pressure minimizes the "breathing" associated with pressure differentials between the underground tank and ambient pressure levels. If the vacuum created by the fuel dispenser's vapor recovery system is not reduced or shut off, the underground tank pressure will increase to the extent that hydrocarbons are released through a pressure vacuum valve or breathing cap associated with the underground tank. In certain applications, reducing the vacuum created by the fuel dispenser's vapor recovery system when an ORVR system is detected permits the ingestion of a volume of air into the underground tank. When saturated with hydrocarbons, the volume of air expands to a volume approximately equal to the volume of fuel dispensed. Adjusting the fuel dispenser's vapor recovery system in this manner minimizes breathing losses associated with the underground tank.

Thus, there remains a need for a fuel dispensing system with a vapor recovery system having the ability to detect a vehicle having an ORVR system and adjusting its vapor recovery system when an ORVR system is detected to reduce breathing losses and wear and tear, as well as conserve energy.

SUMMARY OF THE INVENTION

A. Hydrocarbon Sensing

The present invention is directed to a gasoline dispenser having a vapor recovery system capable of detecting a vehicle having an onboard vapor recovery system. One aspect of the present invention is to adjust the dispenser's vapor recovery system in a manner to complement the vehicle's onboard vapor recovery system during the fueling operation upon the dispenser's vapor recovery system sensing that the vehicle has an onboard vapor recovery system, whereby the respective vapor recovery systems operate in conjunction to maximize fuel vapor recovery.

Still another aspect of the invention is to provide a system for detecting a vehicle having a refueling vapor recovery system which includes a fuel dispenser configured to deliver fuel to a fuel tank of a vehicle, a vapor recovery system operatively associated with the fuel dispenser having a vapor path for removing fuel vapor expelled from the fuel tank of the vehicle during a fueling operation, and a vapor sensor associated with said vapor path for sensing the fuel vapors in the vapor path, wherein when the vapor sensor does not sense fuel vapor during the fueling operation, the fuel dispenser determines the vehicle contains a vapor recovery system. The vapor sensor may be any type of a wide variety of available hydrocarbon sensors.

The vapor sensor may also be made up of an infrared emitter and detector. The infrared emitter transmits infrared waves to the infrared detector through a portion of the vapor path. The vapor sensor can sense the amount of attenuation in a portion of the infrared spectrum caused by any absorption of infrared by hydrocarbons present in the vapor path. The infrared emitter may be a solid state or a black body radiator. The detector may be solid state pyro-electric. These sensor configurations may include the use of piezoelectric crystal embodiments. Additionally, an optical bandpass filter may be used to narrow sensor sensitivity to certain desired wavelengths. In a preferred embodiment, the vapor sensor is a fiber-optic sensor configured to sense hydrocarbons. Fiber optics provide an intrinsically safe passage for any signals emanating from the vapor sensor. Other configurations will become apparent to those skilled in the art. These configurations are considered within the scope of applicants' invention.

In the above-mentioned aspects, once a vehicle having a vapor recovery system is detected, the vapor recovery system of the dispenser may be deactivated, adjusted or have its vapor flow path redirected to atmosphere. Venting the vapor path to atmosphere once an ORVR equipped vehicle is detected appears preferable in applications using liquid driven vapor pumps. The dispenser's vapor recovery system may be adjusted to reduce the vacuum in the vapor recovery path and therefore reduce the rate of vapor flow in the path. In certain applications, minimum vapor flow through the vapor path allows the dispenser to continuously monitor the conditions in the vapor path for error checking, such as assuring a mistake was not made in initial identification of an ORVR equipped vehicle, or to determine if the vehicle's vapor recovery system quits working.

Another aspect of the present invention is to provide a method for detecting a vehicle having a vapor recovery system including delivering fuel to a fuel tank of a vehicle from a fuel dispenser, recovering vapor expelled from the fuel tank of the vehicle during a fueling operation with a vapor recovery system through a vapor recovery path operatively associated with the fuel dispenser for removing fuel vapor, sensing a hydrocarbon level in the vapor recovery path and determining whether the vehicle has an onboard vapor recovery system from the hydrocarbon level sensed in the sensing step. The method includes controlling the vapor recovery system in the dispenser according to the hydrocarbon levels sensed in the sensing step, deactivating the vapor recovery system or redirecting airflow in the vapor recovery path to atmosphere.

B. Pressure Sensing

Another aspect of the present invention is to provide a fuel dispenser configured to deliver fuel to the fuel tank of a vehicle, a vapor recovery system having a vapor recovery path operatively associated with the fuel dispenser for removing fuel vapor expelled from the fuel tank of the vehicle during a fueling operation, and a pressure sensor operatively associated with the fuel dispenser for sensing an increase in vacuum in the vapor recovery path due to a vapor recovery system associated with the vehicle working in opposition to the vapor recovery system of the fuel dispenser. The pressure sensor may be located near a nozzle for dispensing fuel into the vehicle's fuel tank, anywhere along a vapor return line, including inside a vapor recovery pump.

The pressure sensor located near the nozzle may be inside a boot concentrically mounted about the nozzle and configured to sealably engage a vehicle's filler pipe to form a vacuum chamber operatively connected to the vapor recovery system for removing vapors during a fueling operation.

Yet another aspect of the present invention is to provide a method for detecting a vehicle having a vapor recovery system including delivering fuel to a fuel tank of a vehicle from a fuel dispenser, recovering vapor expelled from the fuel tank of the vehicle during a fueling operation with a vapor recovery system through a vapor recovery path operatively associated with the fuel dispenser, and sensing an increase in vacuum in the vapor recovery path due to a vapor recovery system associated with the vehicle working in opposition to the vapor recovery system of the fuel dispenser. Upon detection of a vehicle having a vapor recovery system, in the method the fuel dispenser either controls its vapor recovery system according to the vacuum sensing step or completely deactivates the vapor recovery system. A third option is to redirect the air flow in the vapor recovery path to atmosphere upon detection of a vehicle having a vapor recovery system.

These and other aspects of the present invention will become apparent to those skilled in the art after a reading of the following description of the preferred embodiments when considered in conjunction with the drawings.

DESCRIPTION OF THE PREFERRED EMBODIMENTS

A. Hydrocarbon Sensing

Figure 1:
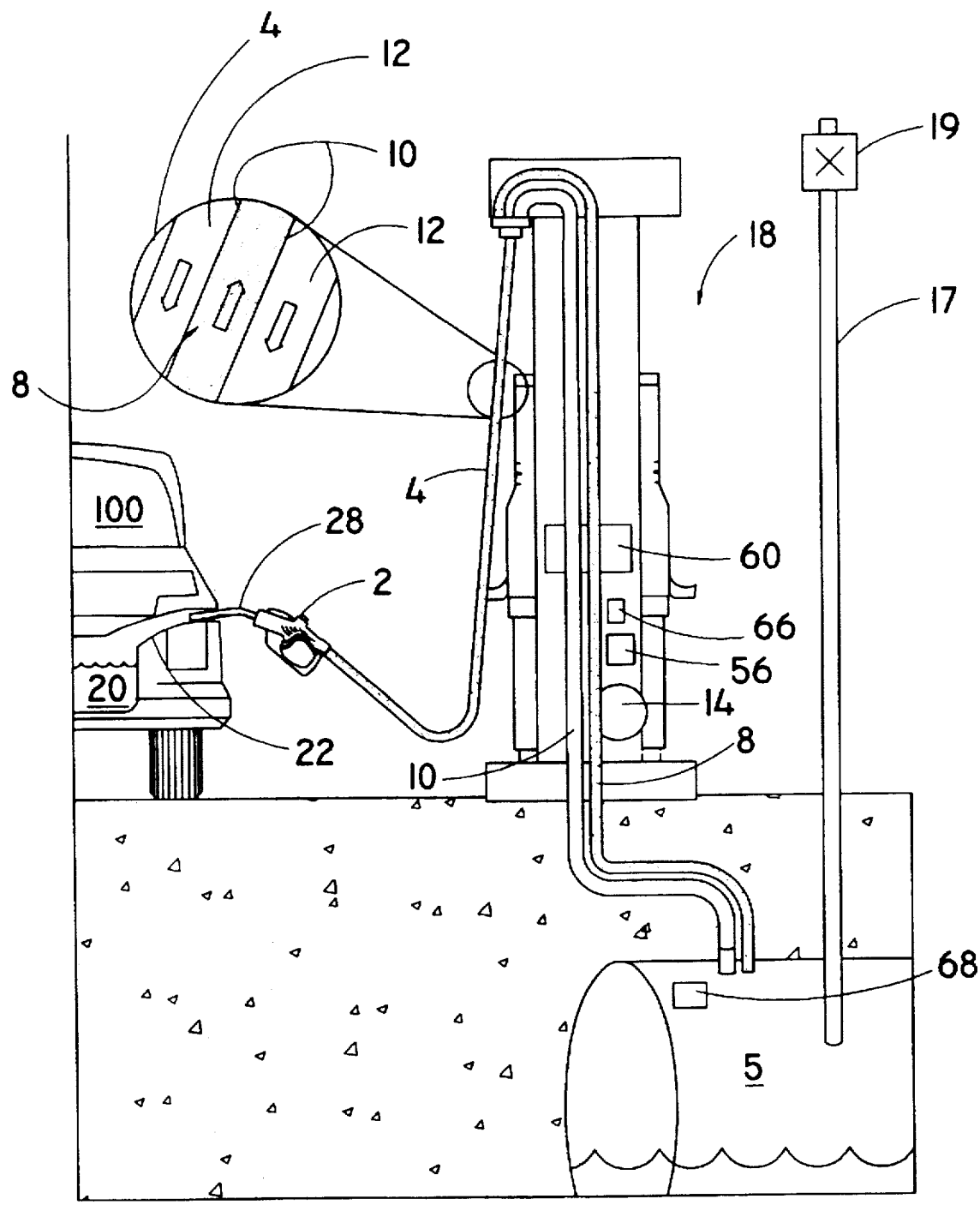
FIG. 1 is an elevational and partial sectional view of a typical gasoline dispenser having a vapor recovery system.

Referring now to the drawings in general and FIG. 1 in particular, it will be understood that the illustrations are for the purpose of describing a preferred embodiment of the invention and are not intended to limit the invention thereto. As best seen in FIG. 1, in a typical service station, an automobile 100 is shown being fueled from a gasoline dispenser or pump 18. A spout 28 of nozzle 2 is shown inserted into a filler pipe 22 of a fuel tank 20 during the refueling of the automobile 100.

A fuel delivery hose 4 having vapor recovery capability is connected at one end to the nozzle 2, and at its other end to the fuel dispenser 18. As shown by the cutaway view of the interior of the fuel delivery hose 4, an annular fuel delivery passageway 12 is formed within the fuel delivery hose 4 for distributing gasoline pumped from an underground storage tank 5 to the nozzle 2. Also within the fuel delivery hose 4 is a tubular vapor recovery passageway 8 for transferring fuel vapors expelled from the vehicle's fuel tank 20 to the underground storage tank 5 during the fueling of a vehicle that is not equipped with an onboard vapor recovery system. The fuel delivery hose 4 is depicted as having an internal vapor recovery hose 10 for creating the vapor recovery passage 8. The fuel delivery passageway 12 is formed between the hose 10 and hose 4.

A vapor recovery pump 14 provides a vacuum in the vapor recovery passage 8 for removing fuel vapor during a refueling operation. The vapor recovery pump 14 may be placed anywhere along the vapor recovery passage 8 between the nozzle 2 and the underground fuel storage tank. The vapor recovery system using the pump 14 may be any suitable system such as those shown in U.S. Pat. No. 5,040,577 to Pope, 5,195,564 to Spalding, 5,333,655 to Bergamini et al., or 3,016,928 to Brandt. Various ones of these systems are now in commercial use, recovering vapor during refueling of conventional, non-ORVR vehicles. The present invention addresses an adaptation of those systems for use with ORVR vehicles.

Figure 2:
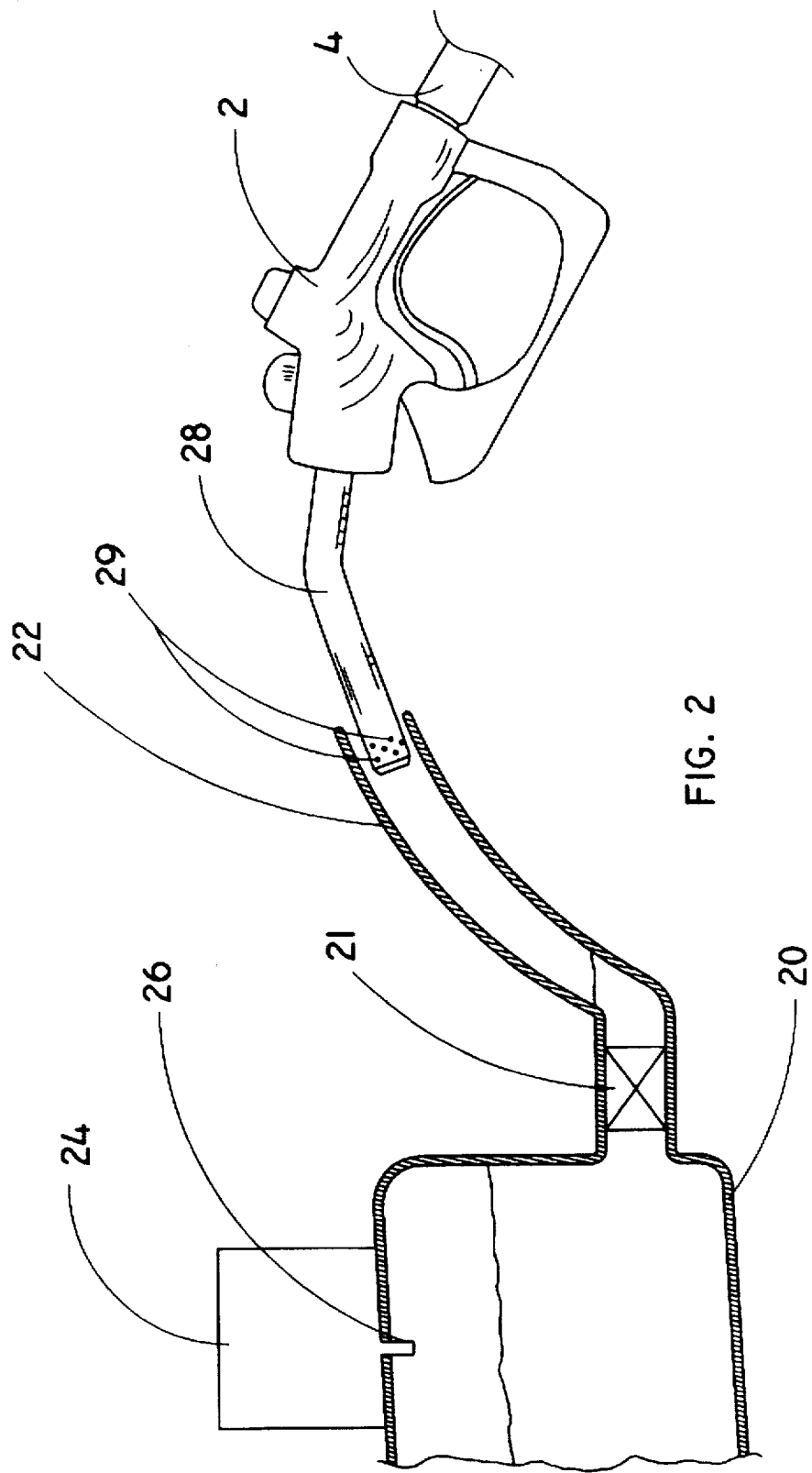
FIG. 2 depicts a typical vacuum assist vapor recovery nozzle and the cross section of a fuel tank of a vehicle equipped with onboard recovery vapor recovery.

Turning now to FIG. 2, the vehicle fuel tank 20 of an ORVR vehicle has an associated onboard vapor recovery system 24. These onboard vapor recovery systems 24 typically have a vapor recovery inlet 26 extending into the tank 20 (as shown) or the filler pipe 22 and communicating with the vapor recovery system 24. In the ORVR system of FIG. 2, incoming fuel provides a seal in fill neck 22 to prevent vapors from within the tank 20 to escape. This sealing action is often referred to as a liquid seal. As the tank fills, pressure within tank 20 increases and forces vapors into the vapor recovery system 24 through the vapor recovery inlet 26. Other ORVR systems may use a check valve 21 along the fill neck 22 to prevent further loss of vapors. The check valve 21 is normally closed and opens when a set amount of gasoline accumulates over the check valve within the fill neck 22.

The spout 28 has numerous apertures 29. The apertures 29 provide an inlet for fuel vapors to enter the vapor recovery path 8 of fuel dispenser 18 from the vehicle's filler pipe 22. As liquid fuel rushes into the fuel tank 20 during a fueling of a vehicle not equipped with an ORVR system, fuel vapors are forced out of the fuel tank 20 through the fill pipe 22. The fuel dispenser's vapor recovery system pulls fuel vapor through the vapor recovery apertures 29, along the vapor recovery path 8 and ultimately into the underground tank 5 (as shown in FIG. 1).

As shown in FIG. 1, the underground tank 5 includes a vent 17 and a pressure-vacuum vent valve 19 for venting the underground tank 5 to atmosphere. The vent 17 and vent valve 19 allow the underground tank 5 to breathe in order to substantially equalize the ambient and tank pressures. In typical applications, maintaining tank pressure between the limits of pressure and vacuum is sufficient. Typical ranges of pressure and vacuum will range between +3 inches of water to −8 inches of water.

Figure 4:
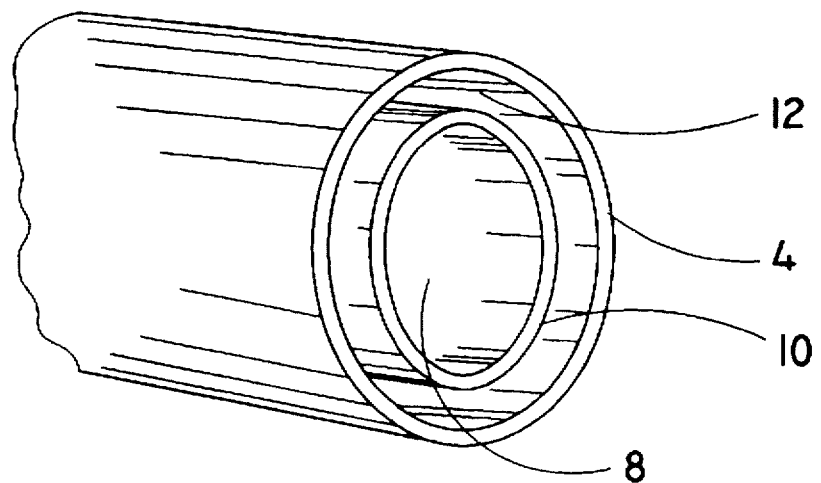
FIG. 4 is a perspective view of a fuel dispenser hose configured for use with a gasoline dispenser having a vapor recovery system.
Figure 5:
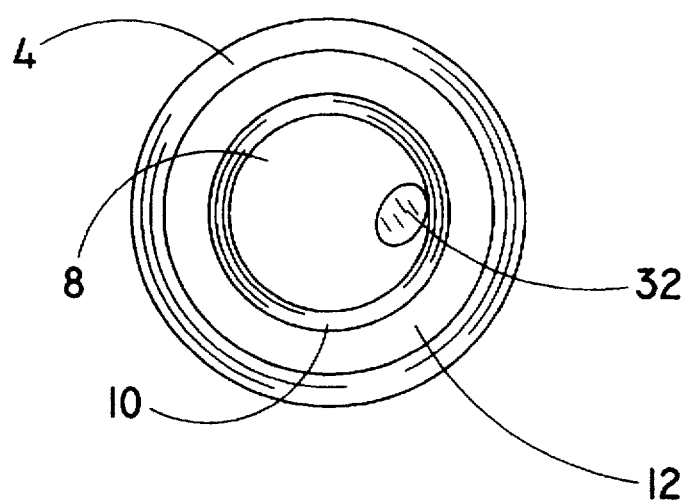
FIG. 5 is a cross-sectional view of a gasoline dispenser hose having a sensor in the vapor return path.

FIGS. 4 and 5 depict partial and complete cross-sectional views of the fuel dispenser hose 4. In an embodiment of the current invention, a hydrocarbon sensor 32 is placed inside the vapor passage 8 to detect the presence or absence of hydrocarbons associated with fuel vapors. An absence of hydrocarbons in the vapor passage 8 indicates the presence of an onboard vapor recovery system in the vehicle being fueled. If an onboard system is detected, the dispenser could either shut off the vapor pump 14 completely, or calculate and control the pump 14 to supply the amount of air to the storage tank needed to replenish the volume of liquid taken from the tank 5 and thus eliminate breathing losses. The hydrocarbon sensor 32 may be located anywhere along the vapor recovery passage 8, including within the vapor recovery pump 14. Certain applications will locate the hydrocarbon sensor 32 at either, or both, an inlet or outlet to the vapor recovery pump 14.

Figure 6:
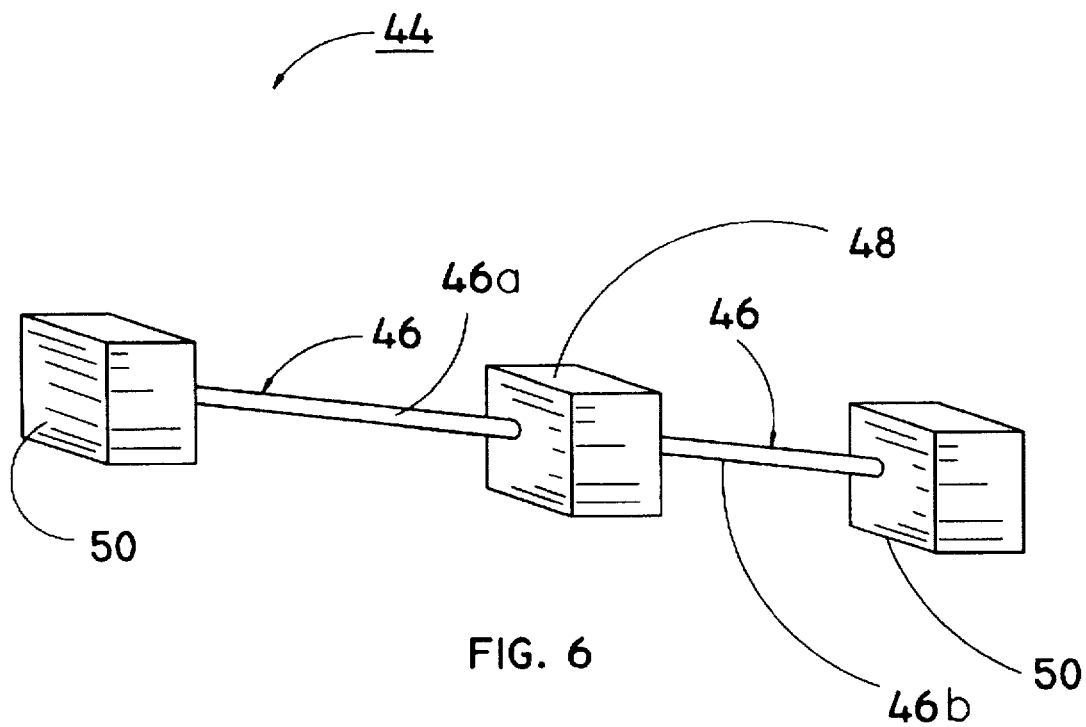
FIG. 6 is an enlarged perspective view of a fiber-optic hydrocarbon sensor.

In one embodiment, the hydrocarbon sensor 32 is a fiber-optic sensor 44 capable of sensing an amount of hydrocarbons present in the vapor return passage 8. The fiber-optic sensor 44 is shown in detail in FIG. 6. Preferably, the fiber-optic sensor 44 uses two fiber-optic light rails 46, a sense fiber 46a and a reference fiber 46b. The sense fiber 46a has a special coating and the reference fiber 46b is isolated. The light rails 46a and 46b run between a single light source 48 and two photodetectors 50. The photodetectors 50 may be photodiodes. The refractive index of the sense fiber 46a changes when in contact with hydrocarbon vapor, causing the fiber to lose light through its surface. This loss of light is proportional to the concentration of hydrocarbon vapor. The amount of light transmitted by the reference fiber 46b is compared to the amount transmitted by the sense fiber 46a. Since they share the same light source 48, any change in the output voltages at the photodetectors 50 can be attributed to the losses from the side of fiber 46a caused by the concentration of the vapor stream.

Figure 7:
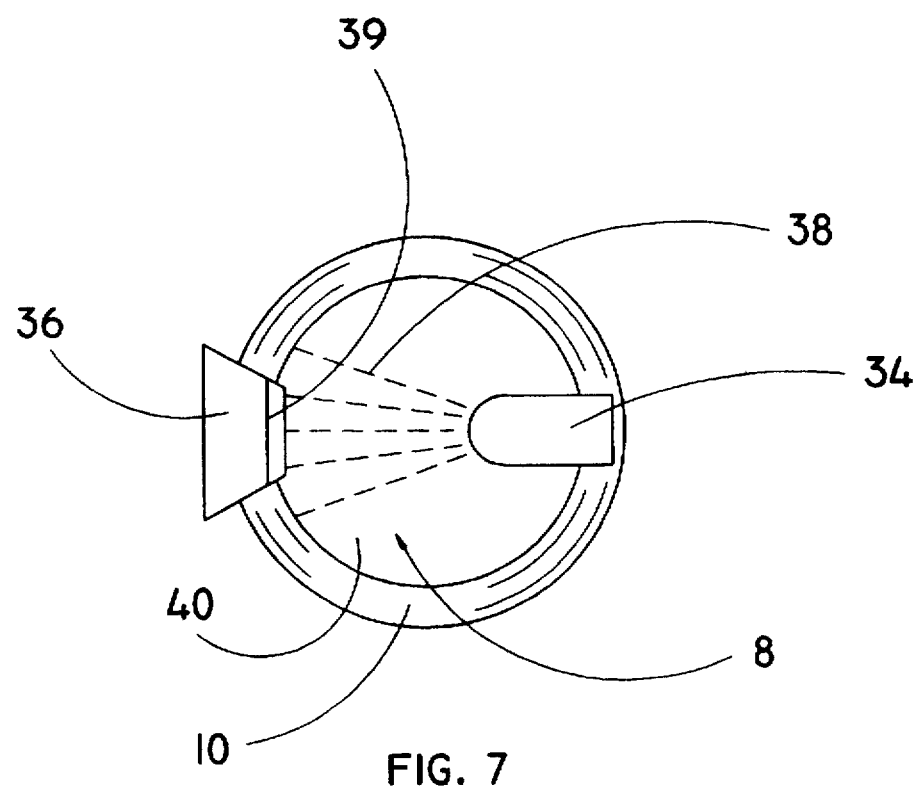
FIG. 7 is a cross-sectional view of a vapor return passage having an infrared transmitter and receiver.

As seen in FIG. 7, another embodiment of the current invention employs an infrared emitter 34 and an infrared detector 36 as a hydrocarbon sensor in the tubing 10. Preferably, the infrared emitter 34 is either a solid state or a black body radiator with an appropriate filter, if required, irradiating through a cross-section of sampled vapor 40 to the infrared detector 36. An optical bandpass filter 39 may be used to narrow the sensor sensitivity to certain wavelengths. The infrared detector 36 is either solid state or pyro-electric infrared (PIR).

The attenuation in the infrared spectrum 38 caused by the absorption of infrared by hydrocarbons is detected by detector 36. When the amount of hydrocarbons to absorb the infrared falls from an expected level during operation, the fuel dispenser may disable or adjust its vapor recovery system.

In the preferred embodiments of the current invention, there is a response time of less than 6 seconds from the beginning of the fueling operation or within delivering one gallon of fuel before detecting whether fuel vapors are normal, present in abnormally low quantities, or not present. The absence or low concentration of hydrocarbons indicates that the vehicle is equipped with an onboard vapor recovery system.

Figure 8:
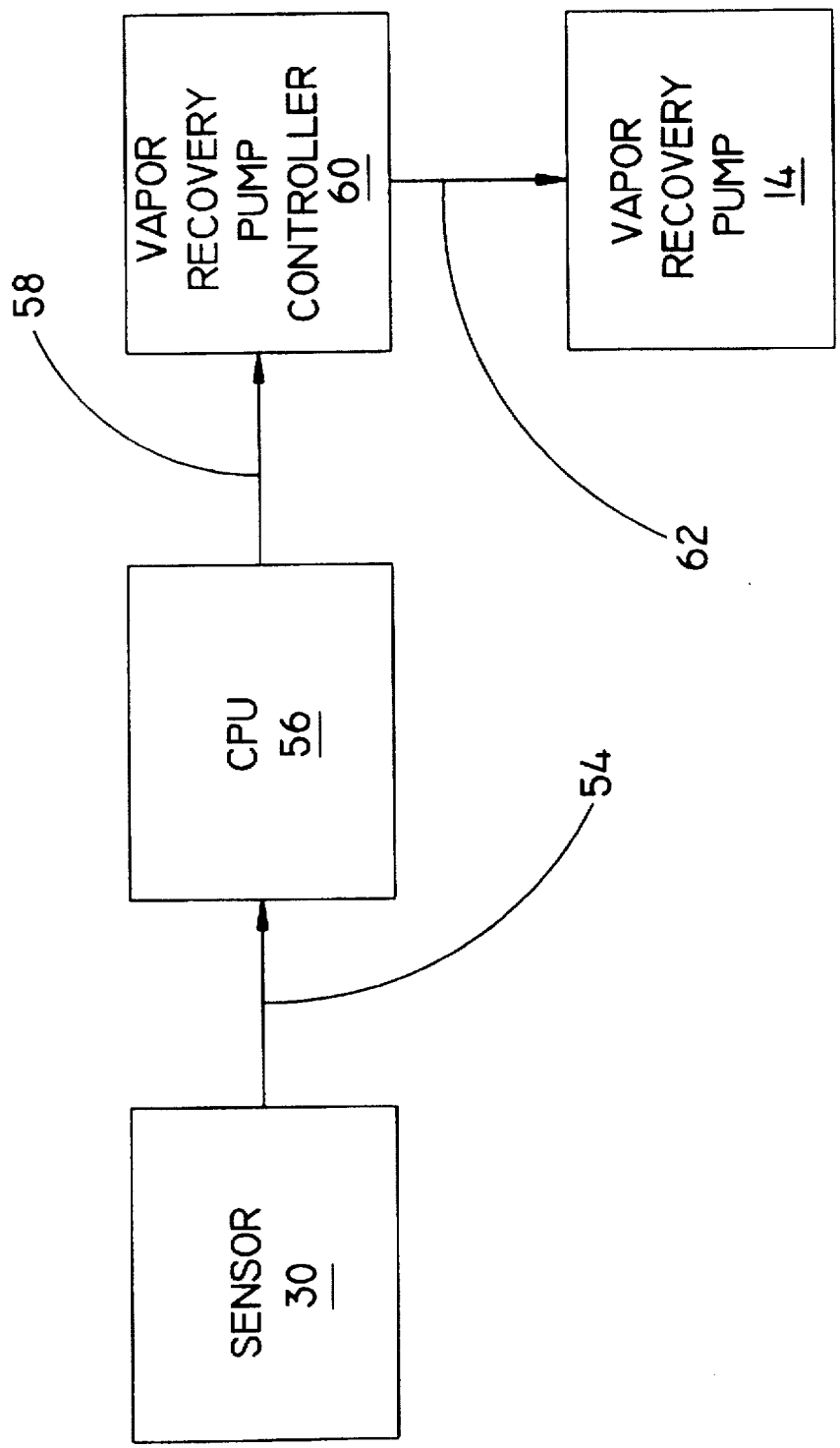
FIG. 8 is a schematic block diagram of a portion of the gasoline dispenser's vapor recovery control system.

The dispenser electronics, as depicted in block diagram in FIG. 8, process a resulting signal 54 from the sensor, whether it be of fiber-optic sensor 44, IR detector 36 or some other sensor, and take appropriate action. The action could take any of several forms. The vapor return pump 14 could slow down in order to reduce the effective vacuum, thereby reducing the effect of vapor growth which the ingestion of clean air often creates. Breathing losses are a major cause of fugitive emissions. If the underground tank pressure is greater than the ambient pressure, hydrocarbon saturated fuel vapor is released into the atmosphere through pressure-vacuum valve 19. In contrast, if the pressure in tank 5 is less than that of the ambient, vent 19 allows fresh air into tank 5 to equalize the pressure. The fresh air becomes saturated with hydrocarbons and increases the pressure within the tank 5 and hydrocarbon laden vapor is then released to ambient through vent 19. As the tank continues to "breathe" in this manner, hydrocarbons are repeatedly released to atmosphere. Thus, it is important to minimize any pressure differential between tank 5 and the atmosphere to prevent the ingestion of air.

When fueling a standard or non-ORVR equipped vehicle, the vapor recovery system of fuel dispenser 18 pulls in enough hydrocarbon vapor and air mixture to compensate for the dispensed liquid fuel and minimize breathing losses. When an ORVR equipped vehicle is detected, the dispenser compensates for the vapor recovered by the vehicle's ORVR system by pulling in ambient air.

Upon detection of an ORVR equipped vehicle, slowing down the vapor return pump 14 allows for continuous monitoring of the vapor concentration in the vapor return passage 8 to ensure that a mistake was not made in the initial identification of an onboard vapor recovery system associated with the vehicle. Alternatively, the vapor recovery pump 14 could simply shut down until the next transaction. Other embodiments of the current invention may forego shutting down the fuel dispenser's vapor recovery system. For example, the system may redirect the flow of air from the apertures 29 through vapor passage 8 to ambient through valve 15 (see FIG. 3). This may be used when the vapor recovery system of the dispenser 18 uses a liquid driven vapor pump 14. Redirecting flow to ambient will prevent over pressurizing the underground tank and reduce breathing losses.

The various sensors, such as the hydrocarbon sensor 32 or the infrared detection sensor 36 provide a signal 54 to a central processing unit (CPU) 56. The CPU 56 evaluates the signal 54 to determine whether the vehicle being fueled has an onboard vapor recovery system. Accordingly, the CPU 56 provides a control signal 58 to a vapor recovery pump controller 60. The vapor recovery pump controller 60 then controls the vapor recovery pump 14 with control signal 62.

Figure 9:
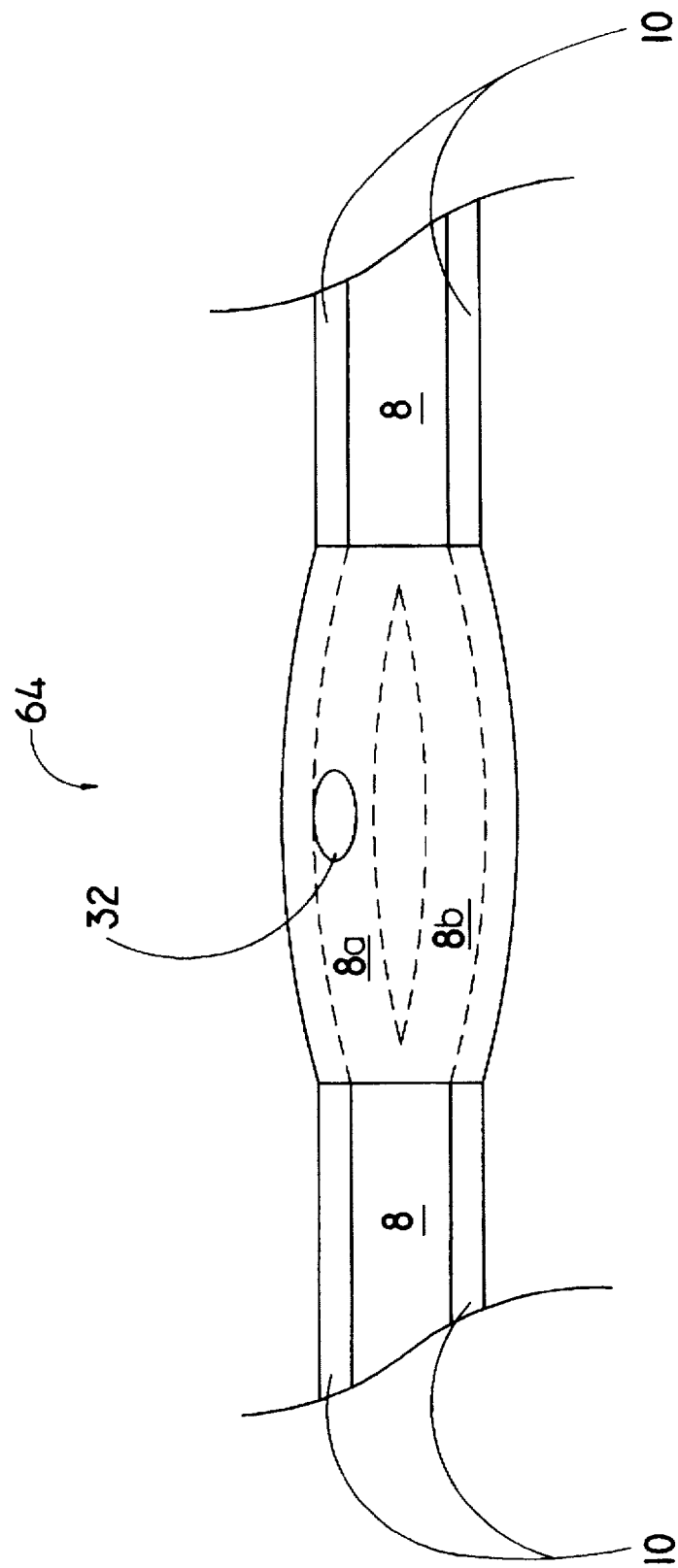
FIG. 9 is a perspective view of a module for diverting vapor flow for hydrocarbon sensing.

As shown in FIG. 9, any of the hydrocarbon sensors 32 may be installed within a separate module 64 designed to divert the flow path of a certain amount of fuel vapors. The module 64 may split the vapor path 8 into two vapor paths 8a, 8b. The hydrocarbon sensor is installed in one vapor path 8b. In the fiber-optic sensor embodiment, vapor path 8b of module 64 may be designed so that only a fraction of the hydrocarbon vapor and air mixture flows over the probe 44.

Figure 3:
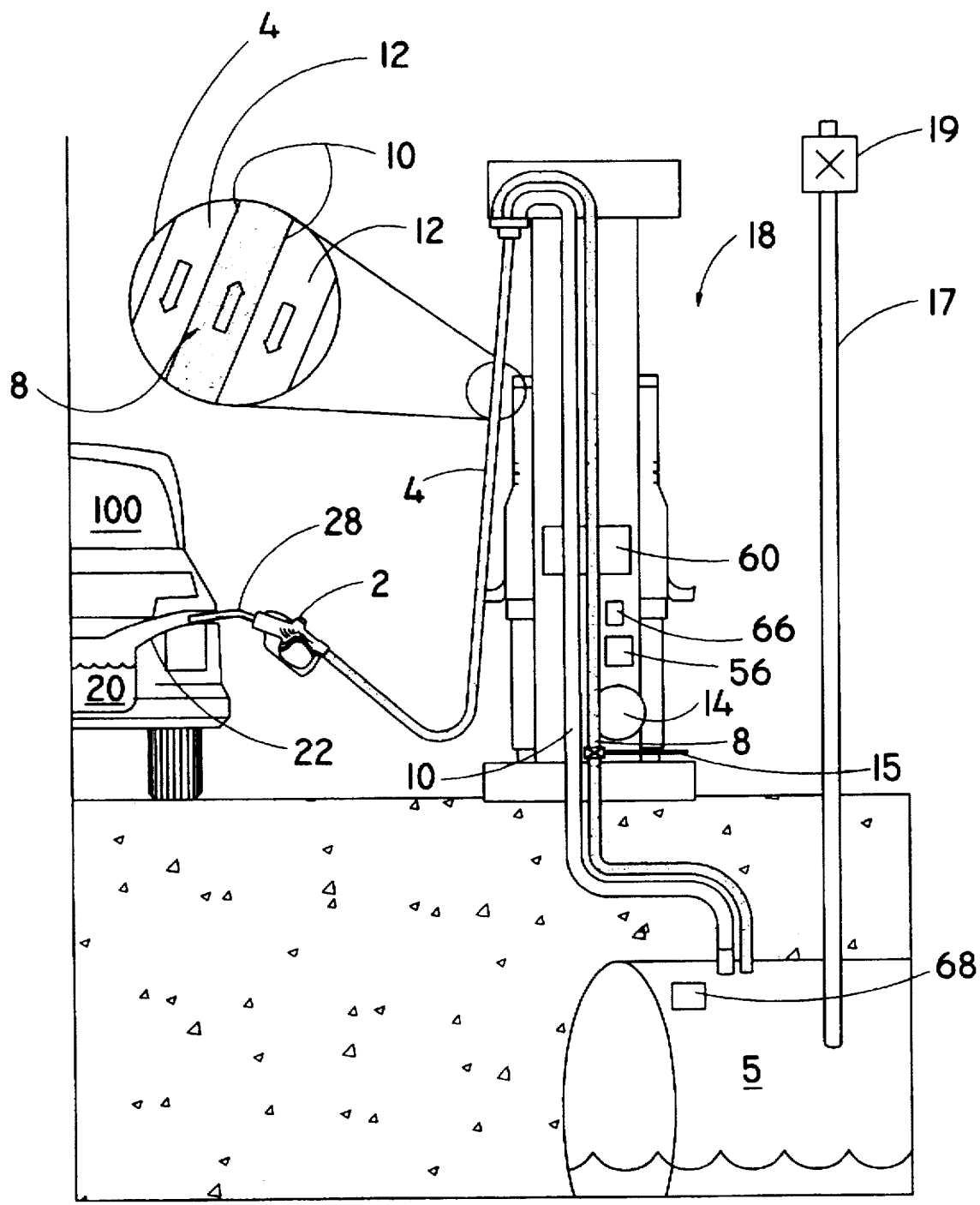
FIG. 3 is an elevational and partial sectional view of a typical gasoline dispenser having a vapor recovery system using a liquid driven vapor pump and an atmospheric vent associated with a vapor passageway.

Once detection of a vehicle equipped with an onboard vapor recovery system occurs, various vapor recovery control options are available. Disabling the fuel dispenser's vapor recovery system reduces underground fuel tank pressure and thereby reduces losses due to fugitive emissions and reduces wear and unnecessary use of assist type vapor recovery systems when operation would be redundant. Alternatively, the dispenser's vapor recovery system is adjusted to reduce the vacuum created by the fuel dispenser during the fueling of an onboard vapor recovery equipped vehicle. The vapor recovery system provides enough ambient air to the underground tank 5, that when the air saturates, the hydrocarbon saturated air volume is approximately equal to the amount of fuel dispensed; thereby minimizing pressure fluctuation in the underground tanks. Another option, particularly useful with liquid driven vapor pumps, is to use an output of CPU 56 to open valve 15 to redirect the airflow in the vapor recovery passage 8 to atmosphere through the vapor passage vent valve 15 (as shown in FIG. 3).

Adjusting the vacuum created by the fuel dispenser's vapor recovery system prevents over pressurizing the underground fuel tanks, thus mitigating fugitive emissions. Fugitive emissions is a collective term for emissions from the vent 19 or any other leak path to the atmosphere at the dispensing facility.

The current invention may adjust the fuel dispenser's vapor recovery system to compensate for both vapor shrink and vapor growth conditions. Typically, during vapor shrink conditions, an amount of air greater than the volume of liquid dispensed is drawn into the tank 5. Vapor shrink conditions usually occur during hot summer months when the ambient temperature is high and the tank temperature is relatively cool. As the air is drawn into the tank, the air contracts. The fuel dispenser compensates for this decrease in volume by increasing the amount of air pulled into the underground tank 5.

In contrast with the vapor shrink conditions, vapor growth conditions typically occur during winter months when the ambient temperature is low and the tank temperature is relatively high. Under vapor growth conditions, the air pulled into the tank expands when subjected to the warmer tank temperatures. The fuel dispenser's vapor recovery system pulls in an amount of air less than the amount of fuel dispensed to compensate for the volume expansion in the tank. The CPU 56 of fuel dispenser 18 may receive temperature data from an ambient temperature sensor 66 and an underground tank temperature sensor 68 (see FIG. 1). Alternatively, rough air ingestion compensation may be accomplished by having predefined flow settings for various times of the day or year. For example, the recovery system can be set to ingest air or vapor mixture in an amount equal to two-thirds the volume of fuel dispensed, thus allowing the air or vapor mixture to expand by a factor of approximately 1.4 or 1.5 to fill the tank volume when saturated.

Also, the fuel dispenser's vapor recovery system continually monitors the vapor concentration to ensure an initial mistake was not made in determining whether or not the vehicle being fueled has an ORVR system or if a malfunction in the vehicle's ORVR system occurs. In either of the latter two cases, the fuel dispenser's vapor recovery system resumes vapor recovery accordingly.

The disclosed and claimed invention also encompasses kits, modules and the like for retrofitting pre-existing dispensers to enable ORVR equipped vehicle detection. For retrofitting, sensor modules are configured to operatively associate with existing pump electronics (see FIG. 8). For example, the sensor and/or sensor module is placed along or within the vapor passage 8 to sense hydrocarbon levels. Preferably, the sensor or module is placed within the vapor passage 8 at points allowing the easiest and most economical access to the vapor path, such as at the inlet or outlet of the vapor pump 14, or other connection points in the system.

B. Pressure Sensing

Figure 10:
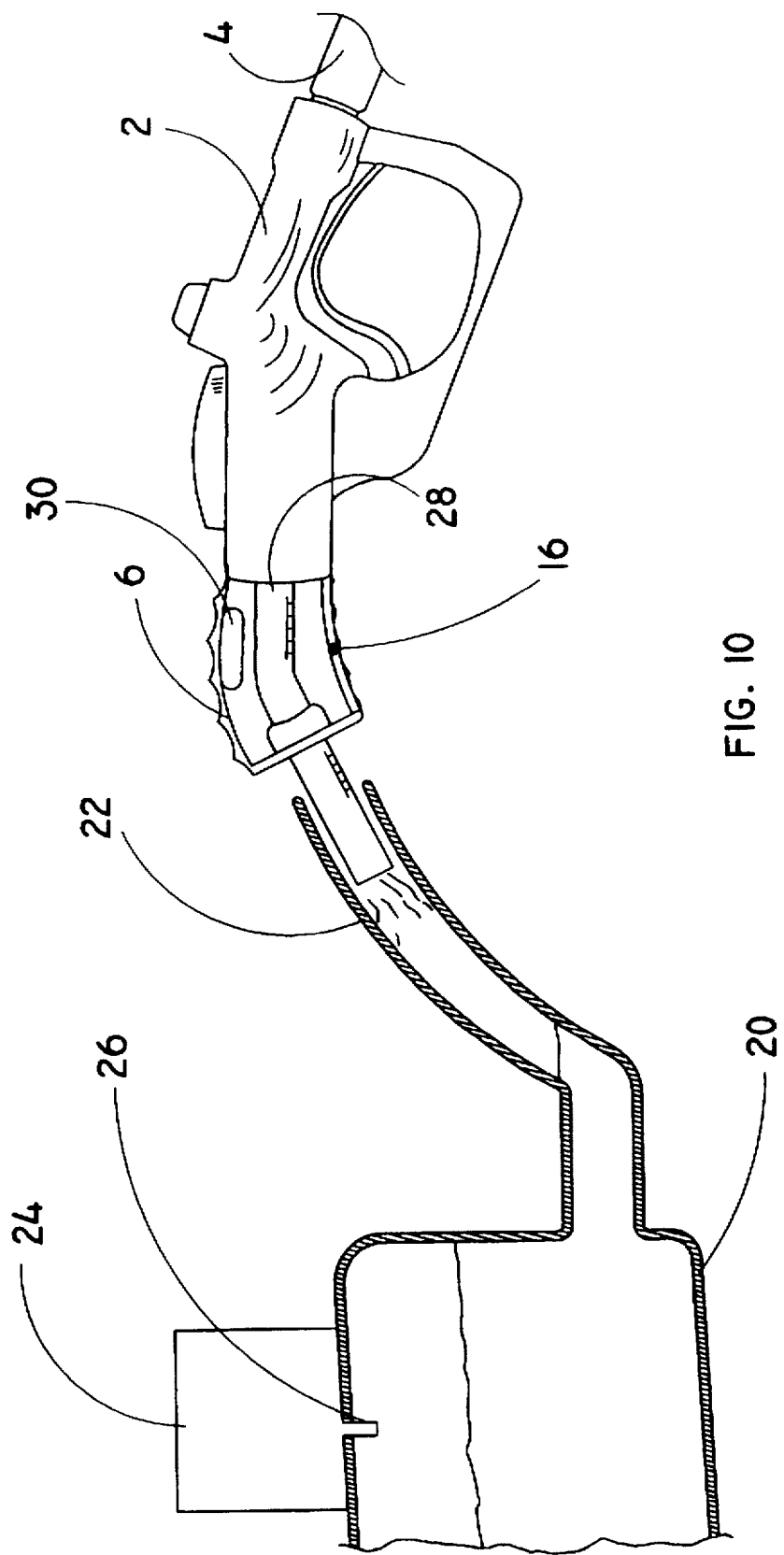
FIG. 10 is an elevational and partial sectional view of a booted fuel dispensing hose and nozzle inserted into a motor vehicle gasoline tank having an onboard vapor recovery system.

In an alternative embodiment for booted vapor recovery systems, as shown in FIG. 10, the nozzle 2 includes a vapor recovery boot 6 for preventing fuel vapors from escaping to atmosphere during the vapor recovery process. The vapor recovery boot 6 of nozzle 2 forms an annular chamber about nozzle 28 and sealably engages the end of filler pipe 22 to prevent the escape of fuel vapors to atmosphere. The annular chamber formed by vapor recovery boot 6 and the nozzle spout 28 operatively communicates with the vapor recovery passage 8. A pressure sensor 30 is placed in the annular chamber formed by the vapor recovery boot 6 and the nozzle spout 28 to detect an increase in vacuum associated with the vehicle's onboard vapor recovery system working in opposition to the fuel dispenser's vapor recovery system. In this embodiment, the increased vacuum may trip the nozzle's automatic shutoff venturi mechanism (not shown) and therefore make fueling extremely difficult if not impossible. Therefore, it is preferable that the seal between the vapor recovery boot 6 and the filler pipe 22 is only semi-tight and the vapor recovery system is vented via valve 15 to allow normal fueling.

Additionally, equipping the vapor recovery boot 6 with an orifice 16 designed to allow a vacuum in excess of 20–25 inches to be developed in the fill pipe area when fueling a vehicle equipped with an onboard vapor recovery system will eliminate premature cut-off. This level of vacuum is high enough to be recognized by the fueling system, but not enough to trip the automatic shutoff mechanism of the nozzle 2. The increase in the vacuum may be detected by placing the sensor 30 in the boot area as shown, at the vapor recovery pump 14, or anywhere along the vapor recovery passage 8.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. An apparatus for dispensing fuel and detecting a vehicle having a vapor recovery system comprising:
   a fuel dispenser configured to deliver fuel to a fuel tank of vehicle;
   a vapor recovery system operatively associated with said fuel dispenser having a vapor path for removing fuel vapor expelled from the fuel tank of the vehicle during a fueling operation;
   a hydrocarbon vapor sensor associated with said vapor path for sensing the fuel vapors in said vapor path and providing a vapor signal indicative of a presence of hydrocarbon vapor; and
   a vapor recovery controller configured to:
   a) receive the vapor signal;
   b) determine whether or not the vehicle has a vapor recovery system based on hydrocarbon vapor concentration in said vapor path during fueling; and
   c) shut off or adjust said vapor recovery system during the fueling operation upon determining that the vehicle has a vapor recovery system.

2. An apparatus as claimed in claim 1 wherein said vapor sensor comprises an infra-red emitter and detector.

3. An apparatus as claimed in claim 1 wherein said vapor sensor includes a piezoelectric crystal.

4. An apparatus as claimed in claim 2 wherein said infra-red emitter and detector are pyro-electric.

5. An apparatus as claimed in claim 2 wherein said infra-red emitter transmits infra-red waves to said infra-red detector through a portion of said vapor path, said vapor sensor sensing an amount of attenuation in a portion of the infra-red spectrum caused by absorption of infra-red by hydrocarbons present in said vapor path.

6. An apparatus as claimed in claim 2 further comprising a filter operatively associated with said sensor, said filter configured to narrow sensor sensitivity to certain wavelengths.

7. An apparatus as claimed in claim 1 further comprising a vent for venting said vapor path to atmosphere upon detection of a vehicle having a vapor recovery system.

8. An apparatus as claimed in claim 1 wherein said vapor recovery system uses a liquid driven vapor recovery pump operatively associated with said vapor recovery path, said pump driven by the fuel delivered to the vehicle.

9. An apparatus as claimed in claim 1, wherein said dispenser's vapor recovery system continues to monitor said vapor path after detection of a vehicle having a vapor recovery system.

10. An apparatus as claimed in claim 9 wherein said vapor recovery system resumes substantial vapor recovery if the vapor recovery system of the vehicle malfunctions.

11. An apparatus as claimed in claim 1 wherein said controller is configured to adjust vapor recovery to pull in an amount of air or hydrocarbon vapor mixture to reduce breathing losses.

12. An apparatus as claimed in claim 2 wherein said infra-red emitter is a black body radiator irradiating through a portion of said vapor path.

13. An apparatus as claimed in claim 2 wherein a sample of gas in said vapor path is subjected to said vapor sensor.

14. An apparatus as claimed in claim 2 wherein said vapor sensor acts upon a gas in said vapor path continuously during a fueling.

15. An apparatus as claimed in claim 1 wherein said vapor recovery system is adjusted by said vapor recovery controller in a manner to assist vapor recovery during the fueling operation upon the sensing of a vehicle having a vapor recovery system, whereby the respective vapor recovery systems operate in conjunction to maximize fuel vapor recovery.

16. An apparatus as claimed in claim 1 wherein said sensor is configured to sense hydrocarbon concentrations during fueling operations of vehicles having vapor recovery systems.

17. An apparatus as claimed in claim 1 wherein said sensor is a fiber-optic sensor configured to sense hydrocarbons.

18. A method for dispensing fuel and detecting a vehicle having a vapor recovery system comprising:
   delivering fuel to a fuel tank of a vehicle from a fuel dispenser having a vapor recovery system with a vapor recovery path operatively associated with the fuel dispenser for removing fuel vapor expelled from the fuel tank of the vehicle during a fueling operation;
   sensing a presence of hydrocarbon in the vapor recovery path; and
   determining whether the vehicle has an onboard vapor recovery system from the hydrocarbon level sensed in the sensing step.

19. A method as claimed in claim 18 further comprising controlling the vapor recovery system of the fuel dispenser according to a concentration of hydrocarbons sensed in the sensing step.

20. A method as claimed in claim 19 wherein said controlling step includes adjusting vapor recovery to pull in an amount of air or hydrocarbon vapor mixture to reduce breathing losses.

21. A method as claimed in claim 18 further comprising redirecting air flow in the vapor recovery path to atmosphere upon detection of a vehicle having a vapor recovery system.

22. A method as claimed in claim 18 further comprising deactivating the vapor recovery system of the fuel dispenser upon detection of a vehicle having a vapor recovery system.

23. An apparatus for adding to a fuel dispenser for detecting a vehicle having a vapor recovery system wherein the fuel dispenser is configured to deliver fuel to a fuel tank of a vehicle, said fuel dispenser including a vapor recovery system operatively associated with said fuel dispenser having a vapor path for removing fuel vapor expelled from the fuel tank of the vehicle during a fueling operation and a vapor recovery controller, said apparatus comprising:
   a hydrocarbon sensor module configured to operatively associate with said vapor path for sensing the fuel vapors in said vapor path,
   a signal path operatively associated with said module and the controller to provide a vapor signal indicative of a presence of hydrocarbons in said vapor path to the vapor recovery controller; and
   a software update for the controller to adapt the controller to determine whether or not the vehicle has a vapor recovery system and to shut off or adjust said vapor recovery system during the fueling operation upon the sensing of a vehicle having a vapor recovery system.

* * * * *